(12) United States Patent
Cornwell et al.

(10) Patent No.: US 9,101,987 B2
(45) Date of Patent: Aug. 11, 2015

(54) TOOL CONNECTOR HAVING MULTIPLE SEATING POSITIONS

(75) Inventors: W. Robert Cornwell, Ronan, MT (US); Nathan C. Cantlon, Charlo, MT (US)

(73) Assignee: Jore Corporation, Ronan, MT (US)

(*) Notice: Subject to any disclaimer, the term of this patent is extended or adjusted under 35 U.S.C. 154(b) by 417 days.

(21) Appl. No.: 12/901,388

(22) Filed: Oct. 8, 2010

(65) Prior Publication Data

US 2011/0215538 A1 Sep. 8, 2011

Related U.S. Application Data

(60) Provisional application No. 61/249,941, filed on Oct. 8, 2009.

(51) Int. Cl.
*B23B 31/107* (2006.01)
*B23B 31/28* (2006.01)

(52) U.S. Cl.
CPC ............... *B23B 31/107* (2013.01); *B23B 31/28* (2013.01); *Y10T 279/17145* (2015.01); *Y10T 279/17752* (2015.01); *Y10T 279/17811* (2015.01); *Y10T 279/23* (2015.01); *Y10T 279/3406* (2015.01)

(58) Field of Classification Search
CPC   B25B 23/0035; B23B 31/107; B23B 31/107; B23B 2260/10; B23B 31/22; B23B 31/06
USPC .................. 279/22, 30, 155, 904, 905, 74, 75
See application file for complete search history.

(56) References Cited

U.S. PATENT DOCUMENTS

| | | | | |
|---|---|---|---|---|
| 6,311,989 | B1* | 11/2001 | Rosanwo | 279/75 |
| 6,543,959 | B1 | 4/2003 | Jore | |
| 6,695,321 | B2* | 2/2004 | Bedi et al. | 279/22 |
| 7,114,728 | B2* | 10/2006 | Chen | 279/24 |
| 7,195,247 | B2* | 3/2007 | Shu | 279/75 |
| 7,448,302 | B2* | 11/2008 | Huang | 81/438 |
| 7,581,470 | B1* | 9/2009 | Huang | 81/438 |
| 8,262,097 | B2* | 9/2012 | Lai | 279/74 |
| 8,308,168 | B2* | 11/2012 | Nash | 279/74 |
| 2004/0164503 | A1* | 8/2004 | Fan-Chiang et al. | 279/75 |
| 2005/0116429 | A1* | 6/2005 | Chang | 279/75 |
| 2006/0049587 | A1 | 3/2006 | Cornwell | |
| 2006/0145431 | A1* | 7/2006 | Chang | 279/74 |
| 2006/0163823 | A1* | 7/2006 | Shu | 279/75 |
| 2007/0108706 | A1 | 5/2007 | Cornwell | |
| 2009/0008886 | A1* | 1/2009 | Shu | 279/103 |
| 2009/0224492 | A1* | 9/2009 | Lin | 279/82 |

\* cited by examiner

*Primary Examiner* — Eric A Gates
*Assistant Examiner* — Paul M Janeski
(74) *Attorney, Agent, or Firm* — Christensen O'Connor Johnson Kindness PLLC

(57) ABSTRACT

A tool connector generally includes a tool receiving portion configured for reciprocating between first and second work tool seating positions, wherein the tool receiving portion is normally biased to the first work tool seating position, and actuatable to the second work tool seating position. The tool connector further includes a magnetic mechanism in the tool receiving portion for providing magnetic force to engage a work tool in either of the first and second work tool seating positions, and a locking mechanism for lockingly engaging a work tool in the second work tool seating position.

15 Claims, 6 Drawing Sheets

TOOL CONNECTOR HAVING MULTIPLE SEATING POSITIONS

CROSS-REFERENCE TO RELATED APPLICATION

This application claims the benefit of Provisional Patent Application No. 61/249,941, filed on Oct. 8, 2009, the disclosure of which is hereby expressly incorporated by reference.

TECHNICAL FIELD

The embodiments described herein relate generally to tool connectors and, more specifically, to tool connectors having multiple seating depths.

BACKGROUND

Tool connectors for tools having a hex shank attachment end are known in the market and have many variations. Such connectors are designed to accept only specifically sized tools, such as one-inch long wire detent style hex bits or two-inch long power driver hex bits with a circumferential ball detent groove in the hex shank, but not both one-inch and two-inch bits. The two-inch bit must necessarily sit deeper in the tool connector in order to transmit torque both forward and aft of the circumferential groove. However, if the one-inch bit were to be seated at this same depth, it would be difficult to grasp the bit during removal and the bit could become jammed into the connector. Thus, a single connector generally cannot be used to drive tools of different sizes and lock configurations, unless it is specifically designed for multiple seating positions.

In some previously designed connectors configured to accommodate multiple seating positions, the one-inch bits are manufactured with nicks so as to be retained by a wire detent mechanism or a ball bearing detent mechanism, for example, as described in U.S. Patent Publication No. 2007/0108706 A1, to Cornwell et al. These designs require precision machining and are more expensive to manufacture and more complicated to use than the embodiments described herein.

Therefore, there exists a need for a tool connector having multiple seating positions with an improved design for ease of use and ease of manufacture.

SUMMARY

In accordance with one embodiment of the present disclosure, a tool connector is provided. The tool connector generally includes a shaft having a tool receiving end, wherein the tool receiving end has first and second seating positions, wherein the first seating position is configured to receive a first work tool and the second seating position is configured to receive a second work tool, wherein the first work tool is different at least in part from the second work tool. The tool connector further includes a collar coupled to the shaft to selectively reciprocate the tool connector between a locked position for engaging at least one of the first and second work tools and an unlocked position for releasing at least one of the first and second work tools when the first or second work tool is received within the shaft. The tool connector further includes a magnet disposed within the shaft for magnetically engaging the first and second work tools when the first or second work tool is received within the shaft.

In accordance with another embodiment of the present disclosure, a tool connector is provided. The tool connector generally includes a tool receiving portion configured for receiving first and second work tools, wherein the first work tool is different at least in part from the second work tool. The tool connector further includes a magnetic mechanism in the tool receiving portion for providing magnetic force to engage at least one of the first and second work tools, and a ball detent locking mechanism for lockingly engaging at least one of the first and second work tools.

In accordance with another embodiment of the present disclosure, a tool connector is provided. The tool connector generally includes a tool receiving portion configured for reciprocating between first and second work tool seating positions, wherein the tool receiving portion is normally biased to the first work tool seating position, and actuatable to the second work tool seating position. The tool connector further includes a magnetic mechanism in the tool receiving portion for providing magnetic force to engage a work tool in either of the first and second work tool seating positions, and a locking mechanism for lockingly engaging a work tool in the second work tool seating position.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Figure 1:
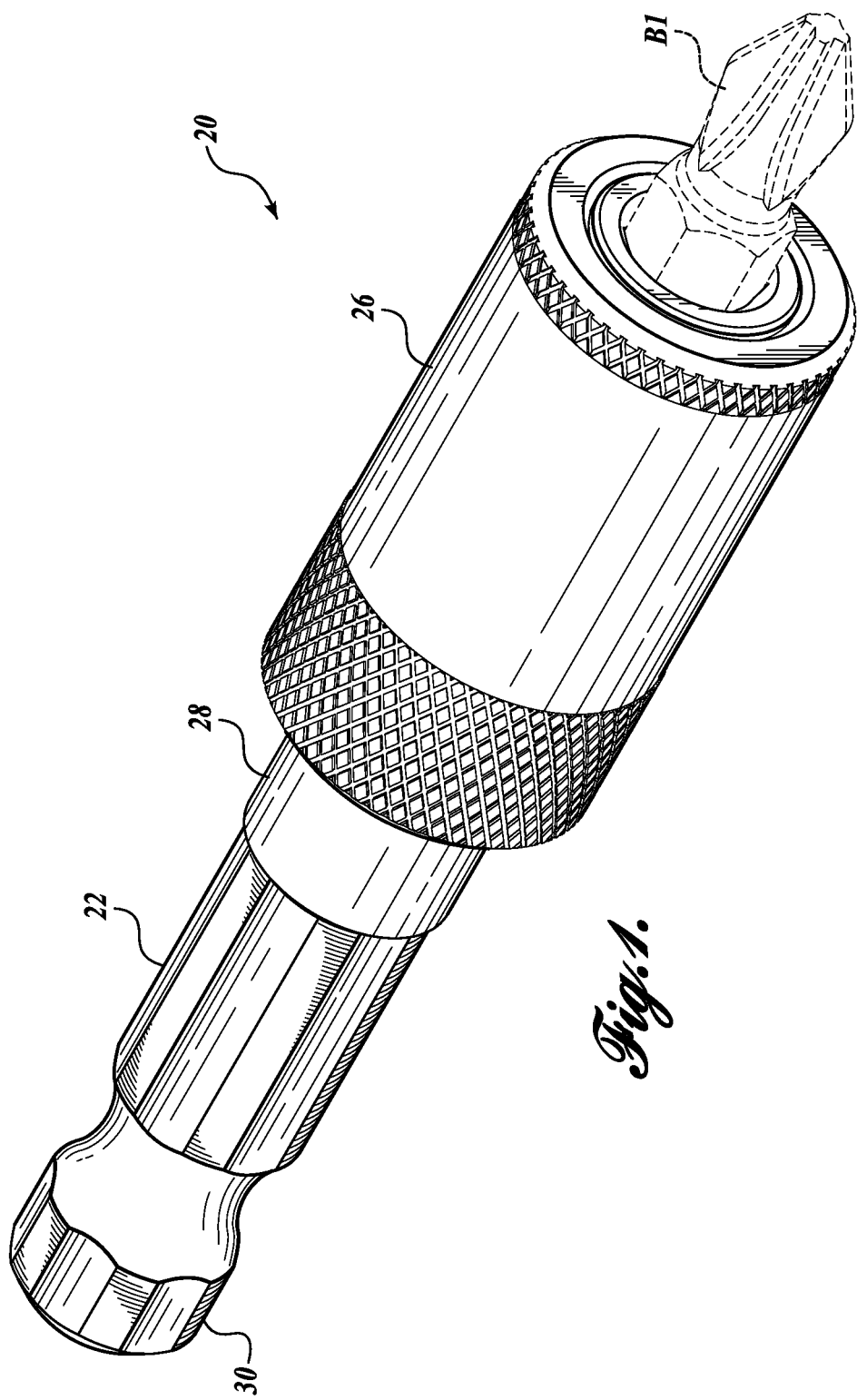
FIG. 1 is a perspective view of one embodiment of a tool connector formed according to various aspects of the present disclosure.

A tool connector 20 constructed in accordance with one embodiment of the present disclosure may be best understood by referring to FIGS. 1-6. In the illustrated embodiment, the tool connector 20 is a one-way quick connector including a shank 22, a shuttle 24, a collar assembly 26, and a shaft 28, which are coupled together to cooperatively form the tool connector 20. The tool connector 20 has a tool receiving portion and a ball detent locking mechanism to reciprocate between locked and unlocked positions to receive and release work tools.

The tool connector of the present disclosure functions similarly to traditional connectors on the market for receiving and locking bits having a circumferential groove for locking with a ball bearing detent mechanism. As non-limiting examples, the tool connector 20 may, for example, be a one-way quick connector, as described in U.S. Patent Publication No. 2007/0108706 A1, to Cornwell et al., or a two-way quick connector, as described in U.S. Patent Publication No. 2006/0049587 A1, to Cornwell, and U.S. Pat. No. 6,543,959 issued to Jore, the disclosures of which are hereby expressly incorporated by reference. The tool connector 20 is preferably constructed of steel or aluminum, yet any material of suitable strength and durability may be used.

The tool connector 20 is configured to releasably receive at least two types of work tools: a first bit B1 (see FIG. 3) and a second bit B2 (see FIG. 4), which are different at least in part from one another. The first bit B1 may be, for example, a one-inch bit or a bit that does not have a circumferential groove for locking with a ball bearing detent mechanism. The second bit B2 may be, for example, a two-inch bit having a circumferential groove G for locking with a ball bearing detent mechanism. While one-inch and two-inch driver bits are shown and described, it should be appreciated that other conventional bits are also within the scope of the present disclosure.

For ease of illustration and clarity, the tool connector 20 is shown in a substantially horizontal orientation, although it may be suitably used in any orientation, such as vertical. Therefore, terminology, such as "front," "rear," "forward," "rearward," etc., should be construed as merely descriptive with reference to the illustrations and, therefore, not limiting. Further, although certain geometric shapes may be illustrated and described below, it should be understood that such terms are intended to be merely descriptive and not limiting. Hence, other geometric shapes, such as oval, round, square, etc., are also within the scope of the present disclosure.

Figure 2:
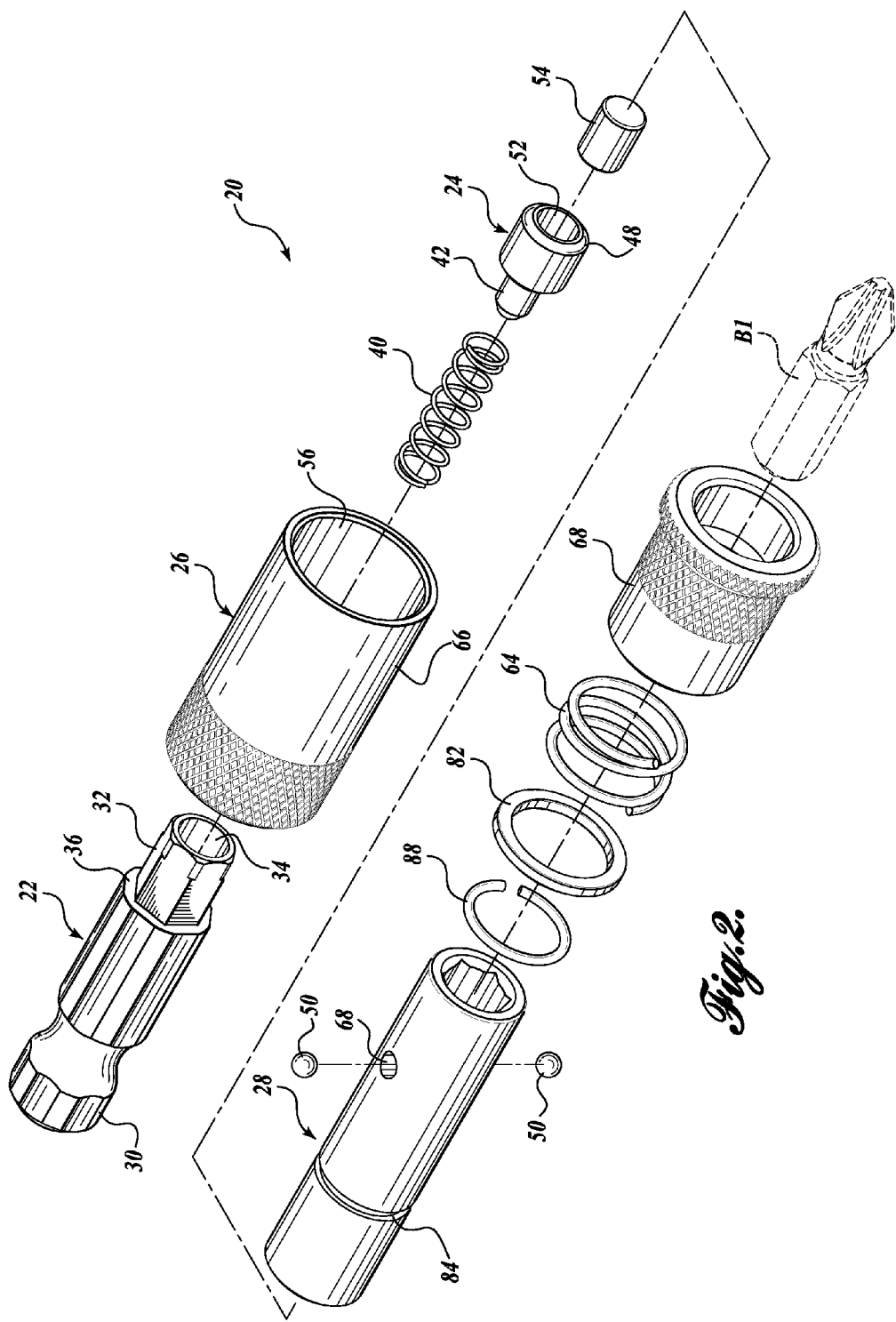
FIG. 2 is an exploded view of the tool connector of FIG. 1.

As may be seen best by referring to FIG. 1, the shank 22 is configured for attaching to a standard hand drill or similar tool. In that regard, the shank 22 includes first and second ends 30 and 32. The first end 30 is an attachment end that is suitably sized and shaped to be received and retained within the receptacle or chuck of any standard hand drill or similar tool. Referring to FIG. 2, the second end 32, which is opposite the attachment end 30 and coaxial with the shank 22, is sized to be fixedly received within a correspondingly shaped axial bore 62 of the shaft 28, as described below. In the illustrated embodiment, the second end 32 is a hex end.

At the second end 32, the shank 22 includes a bore 34 extending partially through the shank 22 from the second end 34 towards the first end 30. The bore 34 is sized and configured to receive a first biasing member, shown as first coil spring 40 (see FIG. 3), to reciprocate the shuttle 24 between shuttle extended and shuttle retracted positions, as described in greater detail below. The bore 34 is also configured to receive a boss or stem 42 of the shuttle 24 when the shuttle 24 is in its retracted position (see FIG. 4). The shank 22 also includes a flange 36 suitably located between the first end 30 and the second end 32. The flange 36 is sized to abut one end of the shaft 28 when the tool connector 20 is assembled.

The shuttle 24 will now be described. The shuttle 24 is designed and configured to reciprocate within the tool receiving portion of the shaft 28 between shuttle extended and shuttle retracted positions for receiving various work tools (compare FIGS. 3 and 4). The shuttle 24 includes first and second ends 44 and 46. The first end 44 interfaces with first coil spring 40, and the second end interfaces with a contact surface in the shaft axial bore 62. In the illustrated embodiment the contact surface is an annular lip 86, which serves as a stop to prevent the shuttle 24 from extending further than the shuttle extended position shown in FIG. 3. A circumferential groove 48 is formed on the perimeter of the second end 46 of the shuttle 24 to interface with the annular lip 86 in the locking mechanism when the tool connector 20 is in the locked position (see FIG. 3).

Figure 3:
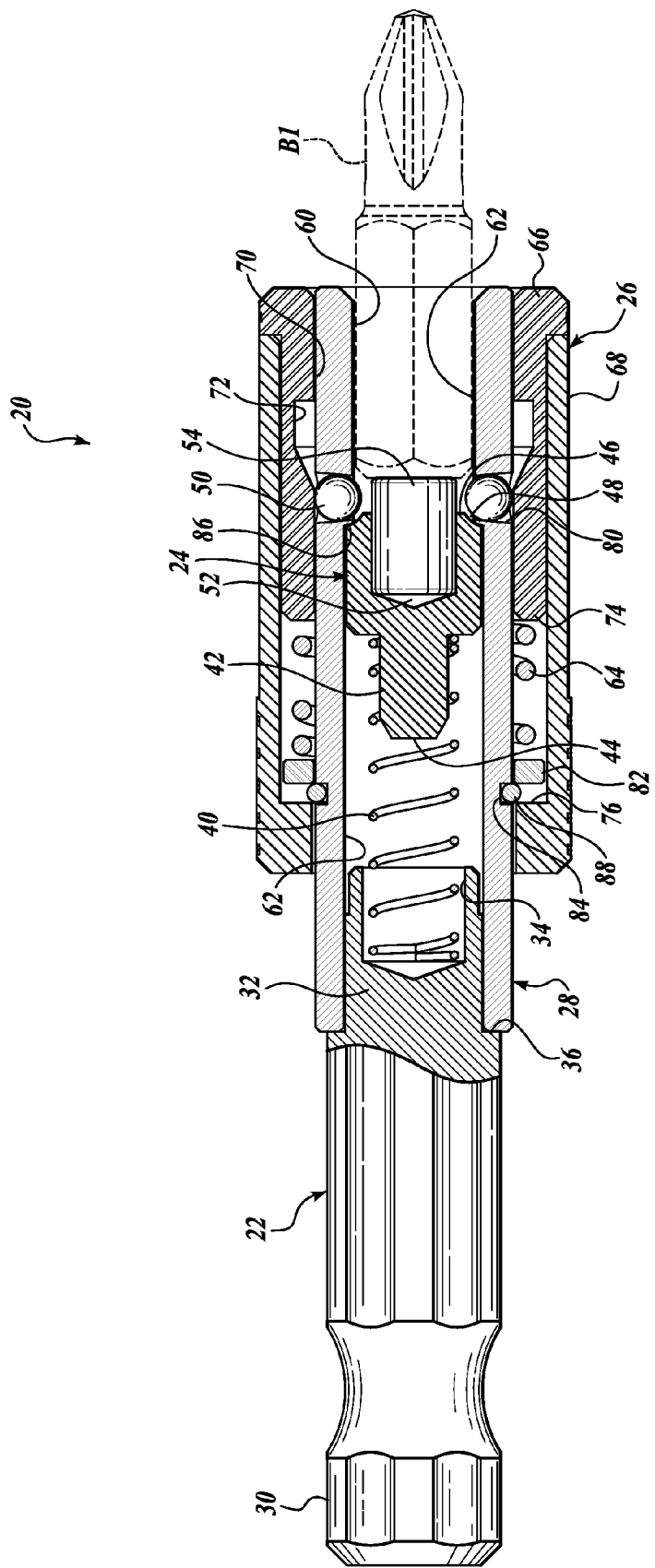
FIG. 3 is a partial cross-sectional side view of the tool connector of FIG. 1, wherein the tool connector is in a locked position and including a first bit seated in tool receiving portion.

The shuttle 24 includes a cavity 52 extending from the second end 46 through at least a portion of the shuttle 24, as seen in FIGS. 2 and 3. The shuttle cavity 52 is sized and configured to receive a plug 54, which provides an abutment to a work tool disposed within the opening or tool receiving portion 60 of the shaft 28 (for example, bit B1 in FIG. 3). The plug 54 is generally cylindrical in shape. The plug 54, when received within the shuttle cavity 52, can be attached within the shuttle cavity 52 in any suitable manner, for example, by adhesive or friction fit. As a non-limiting example, the plug 54 is a magnet for creating a magnetic field to hold a work piece tool (for example, one-inch bit B1) in place, as described in greater detail below.

Figure 4:
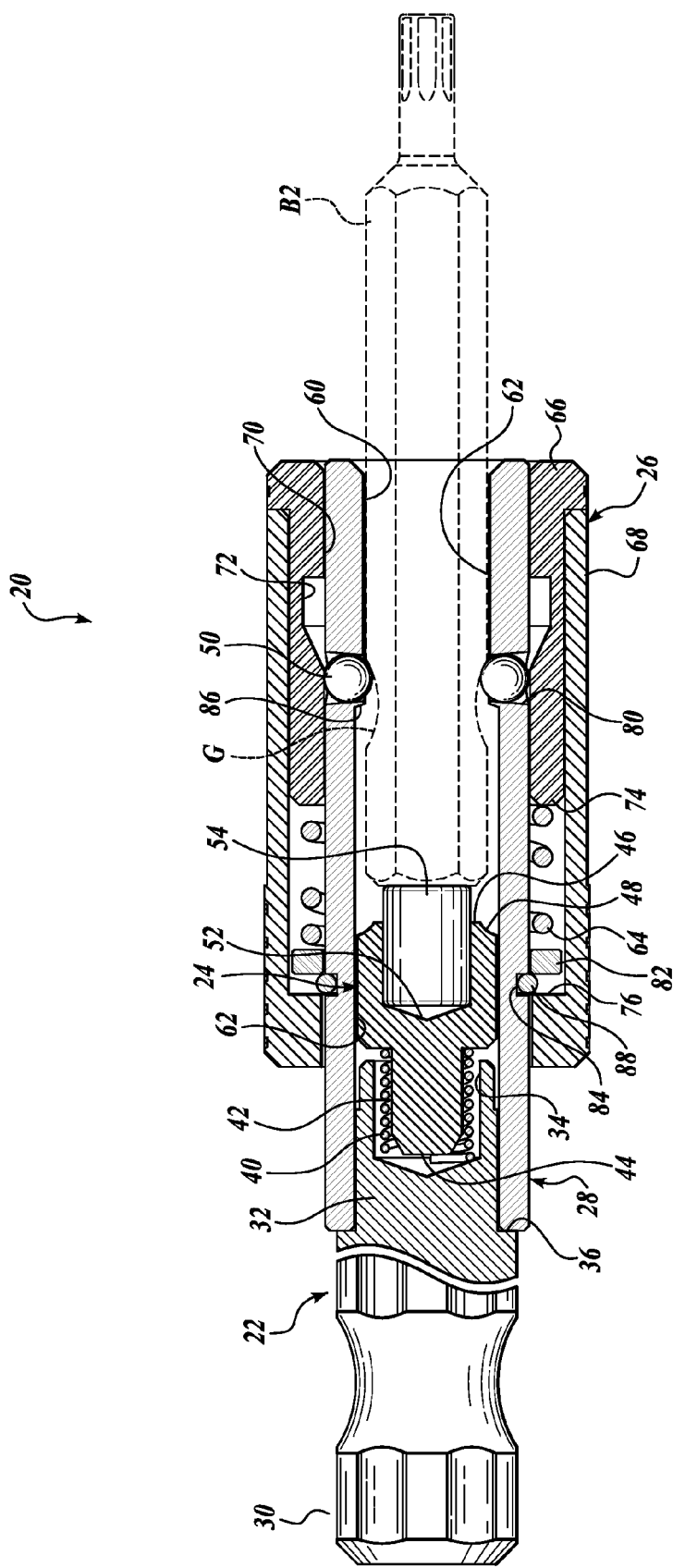
FIG. 4 is a partial cross-sectional side view of the tool connector of FIG. 1, wherein the tool connector is in a locked position and including a second bit seated in the tool receiving portion.

The plug 54, when received within the shuttle cavity 52, provides a continuous abutment to a work tool disposed within the shaft 28 regardless of the length of the work tool, e.g., whether a one-inch bit B1 (see FIG. 3) or a two-inch bit (see FIG. 4). In that regard, the shuttle stem 42 is sized to be slidably received within the bore 34 of shank 22. First coil spring 40 is mounted on the stem 42 such that the end of the coil spring 40 abuts the first end 44 of the shuttle 24 to bias the shuttle 24 away from the shank 22 in a shuttle extended position, as seen in FIG. 3. As described in greater detail below, the shuttle 24 may be reciprocated to a shuttle retracted position such that the shuttle stem 42 is received within the shank bore 34 when, for example, two-inch bit B2 is seated in the tool receiving portion 60 of the tool connector 20, as seen in FIG. 4.

The collar assembly 26 will now be described. The collar assembly 26 includes an inner cavity 70 extending between openings at each end of the collar assembly 26. The cavity 70 is sized and configured to receive the shaft 28. A circumferential groove 72 is formed within the cavity 70. The groove 72 is sized to receive at least one ball bearing 50 to reciprocate the ball bearing 50 into and out of locking engagement with a work tool (for example, two-inch bit B2 in FIG. 4). The ball bearings 50 and the groove 72 form the ball detent locking mechanism.

The collar assembly 26 is normally biased in a locked position (see FIG. 4), such that a work tool B2 cannot be removed from the tool receiving portion 60 of the shaft 28. However, the collar assembly 26 may be reciprocated to the unlocked position (see FIGS. 5 and 6) by user actuation of the collar assembly 26 in the direction of arrow A. Referring to FIGS. 2 and 3, the collar assembly 26 includes a second biasing member, shown as a second coil spring 64, contained between first and second contact surfaces. In the illustrated embodiment, the first and second contact surfaces are collar annular shoulder 74 and washer 82, which stopped by shaft o-ring 88 received in shaft outer annular groove 84. As the collar assembly 26 is actuated in the direction of arrow A (see FIGS. 5 and 6), the second coil spring 64 is compressed.

In the illustrated embodiment, the collar assembly 26 includes first and second collar portions 66 and 68 for ease of manufacture and assembly. It should be appreciated, however, that the first and second collar portions 66 and 68 may be assembled together, for example, by adhesive or friction fit, or may be integrally manufactured as one discreet collar.

The ball bearings 50 not only serve the purpose of retaining bits with circumferential ball grooves G (see bit B2 in FIG. 4), but also provide a rearward stop for one-inch bits (see bit B1 in FIG. 3) or for bits without circumferential ball grooves. In that regard, the ball bearings 50 do not engage with the one-inch bits. If the one-inch bits were to seat to the deepest depth in the connector, for example, at the depth shown in FIG. 4, several problems could result. For example, the bit could jam into the bore 62 of the connector, because on certain bits the working end of the bit is larger in diameter than the bore 62 of the connector and the axial load applied when driving bits could wedge the bit into the connector. In cases where the working end of the bit is small enough not to jam, the bit tip can be so small that it is difficult to grip in order to remove it from the connector if seated too deep.

In the illustrated embodiment, the collar circumferential groove 72 includes an angled portion and a squared portion. The angled portion provides for a smooth transition between the locked and unlocked positions (see the transition from locked to unlocked positions in FIG. 5). The squared portion provides a stopping surface in a first stopping mechanism to prevent the collar assembly 26 from reciprocating rearward in the direction of arrow A beyond the unlocked position, as seen in the illustrated embodiment of FIG. 6.

The collar assembly 26 further includes first and second annular shoulders 74 and 76 formed within the cavity 56. As mentioned above, the first annular shoulder 74 is a first contact surface for the outer coil spring 64, and the second annular shoulder 76 is a stopping surface for interacting with a shaft stopping surface (e.g., shaft o-ring 88 received in shaft outer annular groove 84) to prevent the collar assembly 26 from reciprocating forward (in the opposite direction of arrow A in FIGS. 5 and 6) beyond the locked position, as seen in FIGS. 3 and 4.

Referring to FIGS. 2 and 3, the shaft 28 will now be described. The shaft 28 is configured for receiving work tools. In that regard, the shaft 28 has a tool receiving portion or opening 60 and an internal cavity or axial bore 62. The shaft 28 is sized to be slidably received within the cavity 70 of the collar assembly 26 such that at least a portion of the shaft 28 protrudes out of the collar assembly 26 (see FIG. 1). The axial bore 62 of the shaft 28 is polygonal in shape. Preferably, the axial bore 62 is hexagonal in cross-section to slidably receive the shuttle 24 and the second end 34 of shank 22. In the illustrated embodiment, the shaft opening 60 is a hex-shaped opening sized and configured to receive a correspondingly shaped attachment end of a work tool of the type described above. For example, FIGS. 3 and 4 show the shaft opening 60 of the tool connector 20 receiving, respectively, a one-inch driver bit B1 and a two-inch driver bit B2.

The shaft 28 includes one or more holes 80 to receive the ball bearings 50. The holes 80 are suitably sized and configured to allow the ball bearings 50 to reciprocate between at least two positions: a locked position, wherein the ball bearings 50 at least partially protrude into the axial bore 62 of the shaft 28 (see FIGS. 3 and 4), and an unlocked position (see FIG. 6), wherein the ball bearings 50 move radially outward into the circumferential groove 72 of the collar assembly 26. The holes 80 may be tapered to have a smaller diameter than the diameter of the ball bearings 50 at the shaft axial bore 62 to prevent the ball bearings 50 from being removable from the holes 80 into the shaft axial bore 62. Adjacent the holes 80 is annular lip 86, which serves as a stop to prevent the shuttle 24 from extending further than the shuttle extended position shown in FIG. 3.

Use of the tool connector 20 with a first bit B1 will now be described. Referring to FIG. 3, a first bit B1, for example, a one-inch hit or any hit not having a circumferential groove G for engaging with a ball detent locking mechanism, is positioned in the opening 60 of the shaft 28 in a first seated position. Because the first bit B1 does not have a circumferential groove G, there is no need to actuate the locking collar assembly 26 to an unlocked position to insert the first bit B1 inside the axial bore 62. Instead, the first bit B1 can be inserted into the opening 60 until it contacts the ball bearings 50 housed in the shaft 28. In that regard, the ball bearings 50 protrude into the axial bore 62 of the shaft 28 and are held in place by the locking collar assembly 26 when it is in its locked position. Therefore, the first bit B1 is prevented from moving into a second seated position by the plurality of ball bearings 50 that protrude into the axial bore 62 of the shaft 28.

A one-inch bit or a bit not having the circumferential groove, such as the first bit B1, may be held in a first seated position in the tool connector 20 by magnetic force. For example, the shuttle 24 may include a plug 54 that is a magnet, or the tool connector 20 may include a magnet which is located in the shuttle 24, the shaft axial bore 62, or elsewhere in the tool connector 20. In the illustrated embodiment, the plug 52 is a magnet. The magnet is strong enough to create a magnetic coupling between the first bit B1 and the tool connector 20 such that the first bit B1 does not disengage from the axial bore 62 during normal use. However, the first bit B1 may be disengaged from the axial bore 62 with ease by the user when the user applies enough force to break the magnetic tension between the first bit B1 and the tool connector 20.

Figure 5:
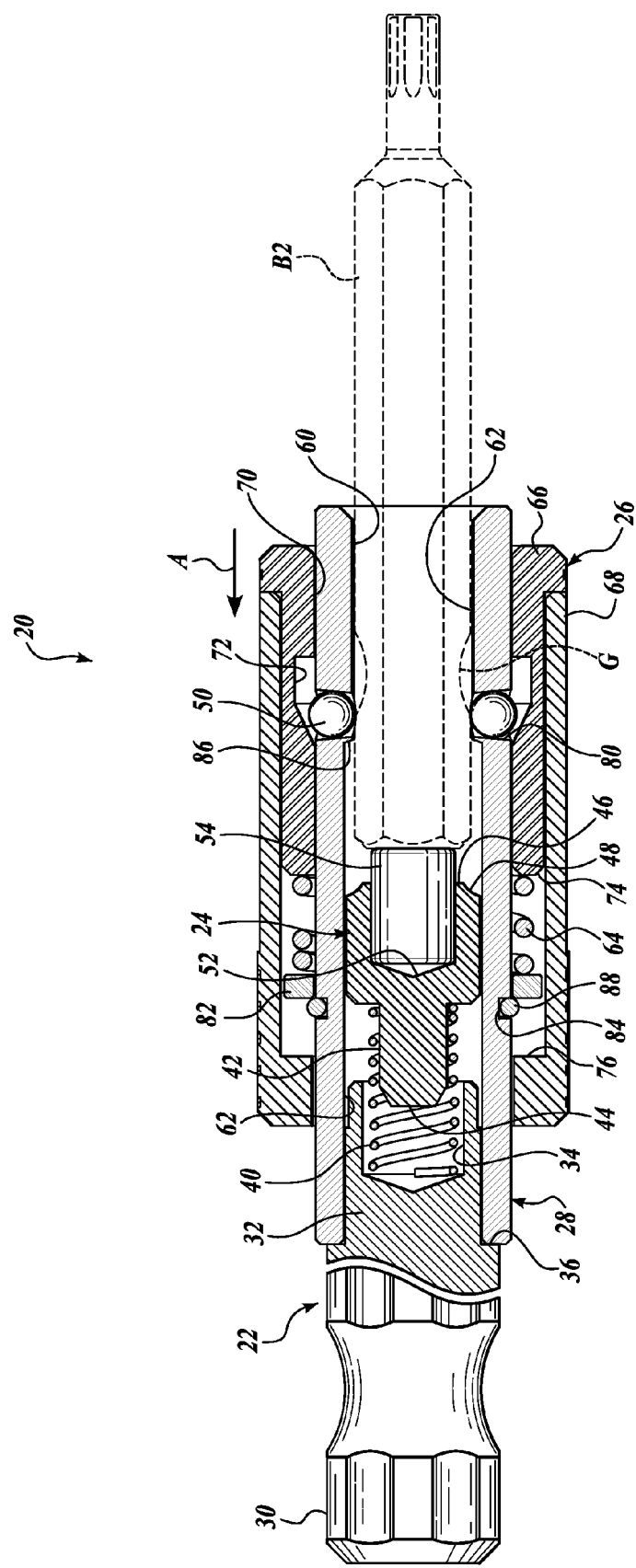
FIG. 5 is a partial cross-sectional side view of the tool connector of FIG. 1, wherein the tool connector is transitioning from a locked position to an unlocked position and including a second bit seated in the tool receiving portion.
Figure 6:
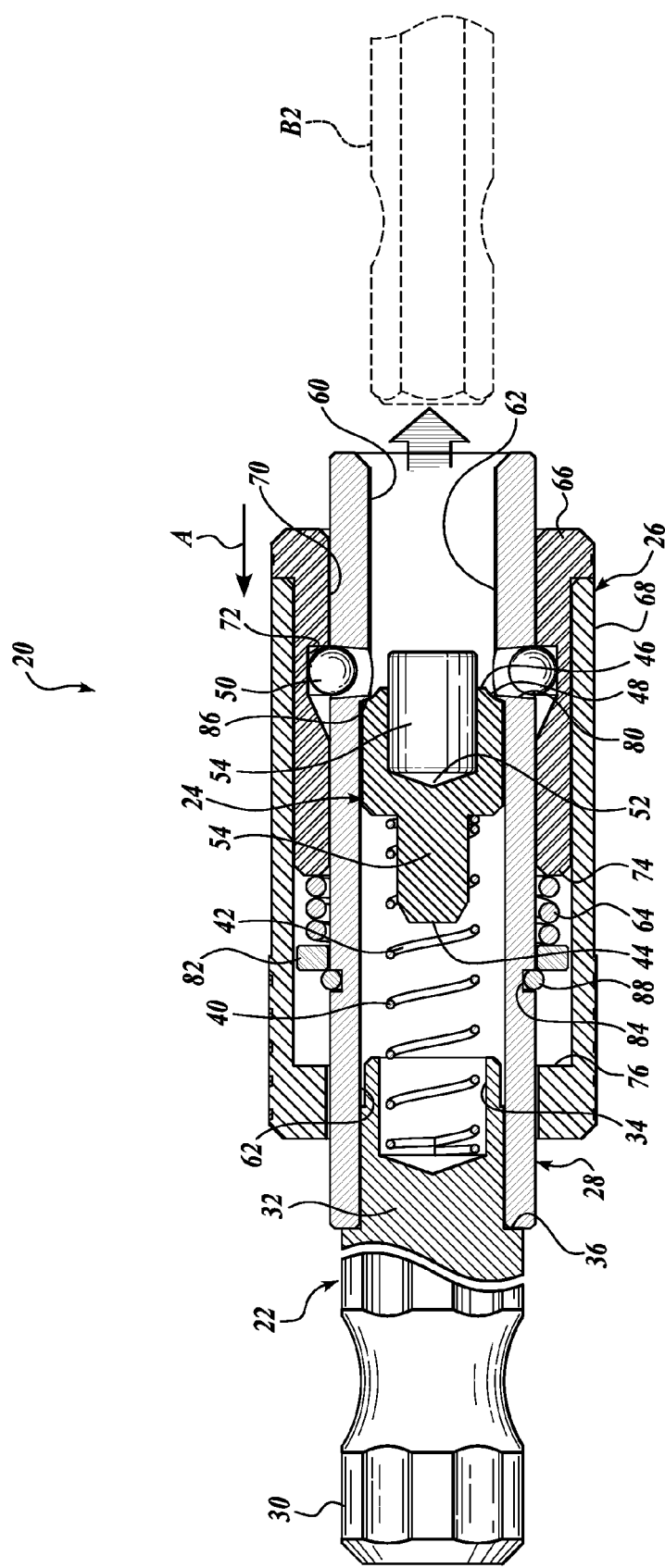
FIG. 6 is a partial cross-sectional side view of the tool connector of FIG. 1, wherein the tool connector is in an unlocked position and the second bit has been removed from the tool receiving portion.

Use of the tool connector 20 with a second bit B2 will now be described. Referring to FIGS. 4-6, a second bit B2, for example, a two-inch bit, is positioned in the axial bore 62 of the tool connector 20. By actuating the external locking collar assembly 26 to an unlocked position (see FIGS. 5 and 6), the ball bearings 50 that protrude into the axial bore 62 of the connector move radially outward, allowing the second bit B2 to be inserted in the bore 62 to a prescribed depth, i.e., into a second seated position. Then, by returning the locking collar assembly 26 to its locked position (see FIG. 4), the ball bearings 50 move inward radially to align with the circumferential groove G on the second bit B2, locking the second bit B2 in place. The alignment of the ball bearings 50 with the circumferential groove G on the second bit B2 results in interference when trying to remove the second bit B2 and therefore locks the second bit B2 into the connector 20.

Although the ball detent locking mechanism is the primary mechanism for retaining the second bit B2 in the axial bore 62, magnetic force from the magnetic plug 54 may also help retain the second bit B2 in the second seated position. The second bit B2 may be disengaged from the axial bore 62 with ease by actuating the collar assembly 26 to the unlocked position, as seen in FIGS. 5 and 6.

The opening 60 to the axial bore 62 of the connector shaft 28 may be a hex broach in order to transmit driving torque to the bits. At the shuttle end of the axial bore 62 of the shaft 28, the counter bore is slightly larger in diameter than the minor diameter of the hex broach on the opposite end. This counter bore allows the spring biased shuttle 24 to move axially inside the shaft, maintaining constant contact with any bit loaded into the connector. As best seen in FIG. 3, a magnet 54 housed in the floating shuttle 24 provides constant magnetic force to a bit, ensuring that one-inch driver bits and other bits not having a circumferential groove G are retained and cannot fall out of the connector 20.

In another embodiment of the present disclosure, the hex broach may be designed to hold the bit in lieu of a magnet to hold a bit. In that regard, the hex broach may include an internal o-ring, snap ring, round ring, or other tensioning device (not shown) for applying tension to the bit. With such tension, the driver bit can be held in place in the hex broach and will not fall out unless removed by the user. It should be appreciated that the hex broach may further include an internal circumferential groove (not shown) for receiving such a tensioning device.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A tool connector capable of releasably holding each of a first work tool at a first seating position and a second work tool at a second seating position, the tool connector comprising:
   a shaft having an axial bore with a tool receiving end;
   a locking assembly coupled to the shaft and comprising a tool locking mechanism, wherein the tool locking mechanism protrudes into the axial bore when the locking assembly is in a locked position, and wherein the tool locking mechanism is retractable from the axial bore when the locking mechanism is in an unlocked position;
   a shuttle disposed within the axial bore such that a leading end of the shuttle is the closest end of the shuttle to the tool receiving end, wherein the shuttle is capable of being reciprocated from an extended position to a retracted position, wherein, when the shuttle is at the extended position, the tool locking mechanism is located between the shuttle and the tool receiving end;
   a stop located within the axial bore and configured to prevent the shuttle from extending further than the extended position toward the tool locking mechanism, wherein the stop is configured to engage the leading end of the shuttle; and
   a magnet extending from the leading end of the shuttle;
   wherein the tool connector is capable of receiving the first work tool from the tool receiving end to the first seating position while the locking assembly is in the locked position, wherein, when the first work tool is at the first seating position, the first work tool is prevented from being further inserted into the axial bore by interference with the tool locking mechanism, the shuttle is located at the extended position, and an end of the first work tool is magnetically coupled to the magnet, and wherein, when the first work tool is located in the first seating position, a majority of an attachment end of the first work tool is located in the axial bore; and
   wherein the tool connector is capable of receiving the second work tool from the tool receiving end to the second seating position while the locking assembly is in the unlocked position, and wherein, when the second work tool is at the second seating position, the shuttle is located at the retracted position, and the locking assembly can be moved to the locked position such that the second work tool is engaged by the tool locking mechanism.

2. The tool connector of claim 1, wherein the locking assembly is biased to the locked position.

3. The tool connector of claim 2, wherein the locking assembly comprises a coil spring configured to bias the locking assembly to the locked position.

4. The tool connector of claim 1, wherein the shuttle is biased to the extended position.

5. The tool connector of claim 4, wherein the locking assembly comprises a coil spring configured to bias the shuttle to the extended position.

6. The tool connector of claim 1, wherein the stop comprises an annular lip in the axial bore.

7. The tool connector of claim 6, wherein the leading end of the shuttle comprises a circumferential groove configured to interface with the annular lip.

8. The tool connector of claim 7, wherein the circumferential groove is further configured to prevent interference with the locking mechanism when the locking mechanism is in the locked position and the shuttle is in the extended position.

9. The tool connector of claim 1, wherein the magnet extends from the leading end of the shuttle such that, when the shuttle is located at the extended position, the magnet extends axially beyond the tool locking mechanism in the axial bore.

10. The tool connector of claim 1, wherein the second work tool comprises a circumferential groove.

11. The tool connector of claim 10, wherein, when the second work tool is located at the second seating position and the locking assembly is moved to the locked position, the tool locking mechanism engages the circumferential groove of the longer work tool.

12. The tool connector of claim 1, wherein the first work tool has a length of about one inch.

13. The tool connector of claim 1, wherein the second work tool has a length of about two inches.

14. The tool connector of claim 1, wherein the axial bore has a cross section that has a polygonal shape, and wherein an attachment end of the first work tool has a corresponding polygonal shape.

15. The tool connector of claim 14, wherein each of the polygonal shape and the corresponding polygonal shape is hexagonal.

* * * * *